(12) United States Patent
Sanhaji

(10) Patent No.: US 10,612,966 B2
(45) Date of Patent: Apr. 7, 2020

(54) APPARATUS AND METHOD FOR WEIGHING CONTENTS OF A STORAGE TANK

(71) Applicant: SNAP-ON CLIMATE SOLUTIONS S.R.L., Correggio (IT)

(72) Inventor: Rahhali Sanhaji, Sesto Fiorentino (IT)

(73) Assignee: Snap-on Climate Solutions S.R.L. of Italy (IT)

(*) Notice: Subject to any disclaimer, the term of this patent is extended or adjusted under 35 U.S.C. 154(b) by 0 days.

(21) Appl. No.: 15/748,916

(22) PCT Filed: Jul. 4, 2017

(86) PCT No.: PCT/EP2017/066701
§ 371 (c)(1),
(2) Date: Jan. 30, 2018

(87) PCT Pub. No.: WO2018/007416
PCT Pub. Date: Jan. 11, 2018

(65) Prior Publication Data
US 2019/0113383 A1    Apr. 18, 2019

(30) Foreign Application Priority Data

Jul. 4, 2016  (IT) .................... 102016000069256

(51) Int. Cl.
*G01G 23/02* (2006.01)
*G01G 17/04* (2006.01)
(Continued)

(52) U.S. Cl.
CPC ......... *G01G 23/02* (2013.01); *B60H 1/00585* (2013.01); *G01G 17/04* (2013.01); *G01G 21/23* (2013.01); *G01G 23/005* (2013.01)

(58) Field of Classification Search
CPC ........ G01G 17/04; G01G 23/02; G01G 23/12; G01G 23/005; G01G 21/28; G01G 23/06; B60H 1/00585
See application file for complete search history.

(56) References Cited

U.S. PATENT DOCUMENTS 4,513,578 A * 4/1985 Proctor .................. F25B 45/00
                                                          62/126
4,726,435 A    2/1988 Kitagawa et al.
(Continued)

FOREIGN PATENT DOCUMENTS

DE    202006001376 U1    7/2007

OTHER PUBLICATIONS

Vishay Tedea-Huntleigh; Single Point Aluminum Load Cell, Model 1022; Document No. 12007; Feb. 10, 2006.
(Continued)

*Primary Examiner* — Randy W Gibson
(74) *Attorney, Agent, or Firm* — McDonnell Boehnen Hulbert & Berghoff LLP

(57) ABSTRACT

The present disclosure relates to apparatuses and methods for weighing contents of a storage tank. One apparatus for weighing contents of a storage tank includes a load cell and a storage tank. The apparatus further includes a first plate removably attached to the storage tank. The apparatus additionally includes one or more compression springs disposed below and supporting the first plate. Still further, the apparatus includes a platform that includes a second plate, between the first plate and the storage tank, and one or more legs. The second plate engages the load cell. Each leg corresponds to one of the compression springs. Each leg extends from the second plate through a through-hole in the first plate and through a corresponding compression spring to a corresponding foot that supports the corresponding (Continued)

compression spring. The storage tank and the first plate are movable relative to the load cell and the platform.

17 Claims, 10 Drawing Sheets

(51) Int. Cl.
   *G01G 21/23* (2006.01)
   *B60H 1/00* (2006.01)
   *G01G 23/00* (2006.01)

(56) References Cited

U.S. PATENT DOCUMENTS

| | | | | |
|---|---|---|---|---|
| 5,603,749 | A | * | 2/1997 | Stelts .................. C21C 7/10 |
| | | | | 266/211 |
| 6,408,637 | B1 | * | 6/2002 | Hanson .................. B01D 1/14 |
| | | | | 62/292 |
| 7,254,954 | B2 | | 8/2007 | Govekar et al. |
| 7,310,956 | B2 | | 12/2007 | Meldahl et al. |
| 7,310,964 | B2 | | 12/2007 | Govekar |
| 7,905,095 | B2 | | 3/2011 | Suharno et al. |
| 8,429,921 | B2 | | 4/2013 | Suharno et al. |
| 9,366,488 | B2 | | 6/2016 | Shanhaji |
| 2011/0203675 | A1 | | 8/2011 | Rahhali |
| 2013/0284277 | A1 | | 10/2013 | Rahhali |
| 2013/0312434 | A1 | | 11/2013 | Sanhaji |
| 2014/0166374 | A1 | | 6/2014 | Deng et al. |
| 2015/0107279 | A1 | | 4/2015 | Sanhaji |
| 2018/0164008 | A1 | | 6/2018 | Sanhaji |

OTHER PUBLICATIONS

Bacharach, Inc.; Stinger Refrigerant Recovery Unit; User Manual 2090-0217 Rev. 6; Apr. 2012.
Bosch Automotive Service Solutions LLC; Recovery/Recycling/Recharging Unit Operating Manual, Model 17800B / 17801B; Sep. 9, 2013.
Bosch Automotive Service Solutions LLC; Operating Manual for Model 34988 Recovery, Recycling, Recharging Unit; 554228 Rev. E; Jul. 30, 2013.
Snap-On Incorporated; Air Conditioning Equipment and Tools 2010 Catalog; Feb. 24, 2010.
Snap-On Incorporated; A/C Equipment and Tools; Are you Ready for A/C Season?; Mar. 26, 2013.
Snap-On Incorporated; Service Center, A/C, ECO Plus, R134a; downloaded from the World Wide Web at https://store.snapon.com/ECO-Plus-A-C-Service-Center_R134a-Service-Center-A-C-ECO-trade-Plus-R134a-P6478708.aspx; Mar. 21, 2016.
Propane 101; Promoting Propane Safety Through Better Understanding; downloaded from the World Wide Web at http://www.propane101.com/consumerlpgcylinderparts.htm; Jun. 27, 2016.
Mastercool, Inc.; Mastercool ECK1800 user manual—downloaded from the world wide web at http://www.mastercool.com/wp-content/uploads/2015/03/copia_di_d000004039_0002_0001.pdf; Mar. 2015, pp. 1-39 (English).
Snap-On Incorporated; ECO Xtreme User's Manual, Mar. 7, 1997.
The International Search Report of PCT/EP2017/066701 dated Sep. 11, 2017, pp. 1-3.
Written Opinion for the International Searching Authority of PCT/EP2017/066701 dated Sep. 11, 2017, pp. 1-8.
Search Report of Italian Patent Application No. IT 201600069256 dated May 24, 2017, pp. 1-10.

* cited by examiner

US 10,612,966 B2

APPARATUS AND METHOD FOR WEIGHING CONTENTS OF A STORAGE TANK

CROSS-REFERENCE TO RELATED APPLICATION

This application is a U.S. national phase of International Application No. PCT/EP2017/066701, filed on Jul. 4, 2017, which claims priority to Italian Patent Application No. 102016000069256, filed Jul. 4, 2016, both of which are incorporated by reference herein in their entirety.

BACKGROUND

Many vehicles come equipped with systems that utilize refrigerants, such as air conditioning systems, for example. The refrigerant (1,1,1,2-tetrafluoroethane—R-134a, for example) contained within such systems may need to be supplemented, recycled, or removed on occasion. In order to remove the refrigerant, refrigerant recovery units can be used. To meet certain recovery standards, such refrigerant recovery units can measure an amount of refrigerant that has been removed from or deposited in a vehicle.

Refrigerant recovery units can be equipped with a storage tank for storing refrigerant. In order to determine the amount of refrigerant that has been removed from or deposited in the vehicle, the storage tank and any contents thereof may be weighed to determine the mass of refrigerant within the storage tank using a scale system. In some cases, the storage tanks and scale systems can be prone to vibration or movement during transportation of the refrigerant recovery unit from one location to another. This can lead to damage inflicted on the scale system. For example, the storage tank can impact a load cell within the scale system, thereby damaging the load cell.

OVERVIEW

Several example embodiments that relate to apparatuses and methods for weighing contents of a storage tank are described herein.

Viewed from one aspect, an example embodiment takes the form of an apparatus. The apparatus includes a load cell. The apparatus also includes a storage tank. The apparatus further includes a first plate removably attached to the storage tank. Additionally, the apparatus includes one or more compression springs disposed below and supporting the first plate. Still further, the apparatus includes a platform. The platform includes a second plate. The second plate is disposed between the first plate and the storage tank. The second plate engages the load cell. The platform also includes one or more legs. Each leg corresponds to one of the one or more compression springs. Each leg extends form the second plate through a through-hole in the first plate and through a center of the corresponding compression spring to a corresponding foot that supports the corresponding compression spring. The storage tank and the first plate are movable relative to the load cell and the platform.

Viewed from another aspect, an example embodiment takes the form of a method. The method includes applying, by a storage tank and contents of the storage tank, due to a weight of the storage tank and a weight of the contents of the storage tank, a force on a first plate removably attached to the storage tank. The method also includes dampening, by one or more compression springs disposed below and supporting the first plate, kinetic energy associated with the applied force. The method further includes transmitting, by the one or more compression springs, the applied force to a second plate of a platform via one or more feet of the platform corresponding to one or more legs of the platform. Each leg of the platform corresponds to one of the one or more compression springs. Each leg extends from the second plate through a through-hole in the first plate and through a center of the corresponding compression spring to the one or more feet. The one or more feet support the corresponding compression spring. Additionally, the method includes applying, by the platform, the applied force on a load cell.

These as well as other aspects and advantages will become apparent to those of ordinary skill in the art by reading the following detailed description, with reference to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

DETAILED DESCRIPTION

I. Introduction

Figure 1:
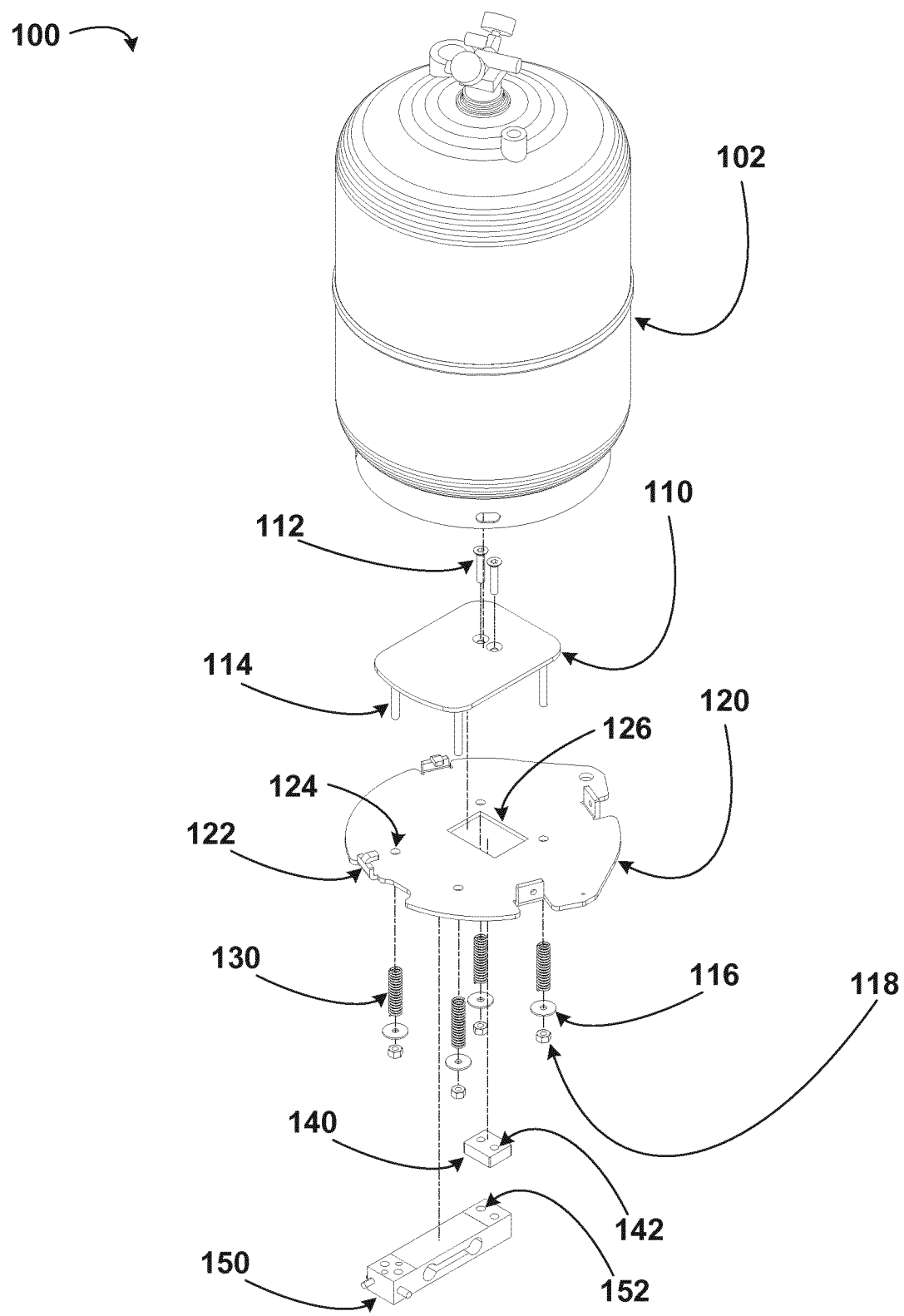
FIG. 1 is an exploded-view illustration of an apparatus, according to example embodiments.

This description describes several embodiments, at least some of which pertain to weighing contents of a storage tank. At least some of the example embodiments disclosed herein include apparatuses and methods. One such embodiment is an apparatus that weighs a storage tank and any contents of the storage tank. The apparatus includes a load cell, a storage tank, a first plate, one or more compression springs, and a platform, which includes a second plate and one or more legs. The apparatus can be configured to measure a weight of vehicle refrigerant stored within the storage tank.

The first plate is removably attached to the storage tank. This can include bolting the first plate to the storage tank, screwing the first plate to the storage tank, mounting the first plate to the storage tank, or otherwise fastening the first plate to the storage tank. Further, the storage tank can include a ring having through-holes, such as a foot ring along a base of the storage tank. The through-holes can allow one or more fasteners to pass through the through-holes and attach to the first plate or a bracket, tab, or hook of the first plate.

The one or more compression springs are located below the first plate and can support the first plate. For example, when the storage tank is in a steady-state position (i.e., the storage tank is not moving upward or downward), the first plate can rest, stationary, on top of the compression springs. When compressed, the one or more compression springs apply an upward force against the first plate. Further, in some embodiments, the compression springs can be preloaded to press the first plate against an underside of the second plate.

The second plate of the platform is located between the first plate and the storage tank. The second plate also engages the load cell, which is a strain gauge load cell in some embodiments. Thus, force can be transmitted from the second plate to the load cell. The second plate can engage the load cell through a set of pins or fixing screws, for example. There can also be a spacer between the load cell and the second plate.

Each of the legs can be attached to a bottom-side of the second plate. For example, each of the legs can be adhered, pressed into, or bolted to the second plate. Each of the one or more legs also corresponds to one of the one or more compressions springs. Further, each leg extends from the second plate through a through-hole in the first plate. Additionally, each leg extends through a center of the corresponding compression spring to a corresponding foot. The feet are attached to the bottom of the legs. In some embodiments, the feet include a washer and a nut threaded onto the bottom of the leg. The feet also serve to support the bases of the corresponding compression springs.

Conceptually, the storage tank, the first plate, and the compression springs move with respect to the second plate, the one or more legs, and the load cell. The second plate, the one or more legs, and the load cell are ostensibly fixed. This allows the storage tank, the first plate, and the compression springs to apply a force to the load cell. This force is measured by the load cell as an associated weight.

An example measurement can occur in the following way. The storage tank, and any contents thereof, apply a downward force on the first plate. The first plate in turn applies a corresponding downward force on the one or more compression springs. The downward force on the compression springs is transmitted to the feet of the legs. Next, the legs transmit the downward force via the legs to the second plate. The second plate then transmits the downward force to the load cell (e.g., through one or more fixing screws). In this way, the force caused due to a weight of the storage tank and its contents is imparted on the load cell. The load cell can thus measure this weight.

Further, in some embodiments, the compression springs can act as dampening mechanisms. In such embodiments, the energy transmitted by the storage tank to the load cell can be reduced or eliminated. This can occur due to the compression springs temporarily storing some of the kinetic energy from the storage tank, thereby increasing a time interval over which the kinetic energy of the storage tank is transferred to the load cell. In some embodiments, this can allow for vibrations and movements of the storage tank during transportation of the apparatus without harm to the load cell.

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise.

Figure 4:
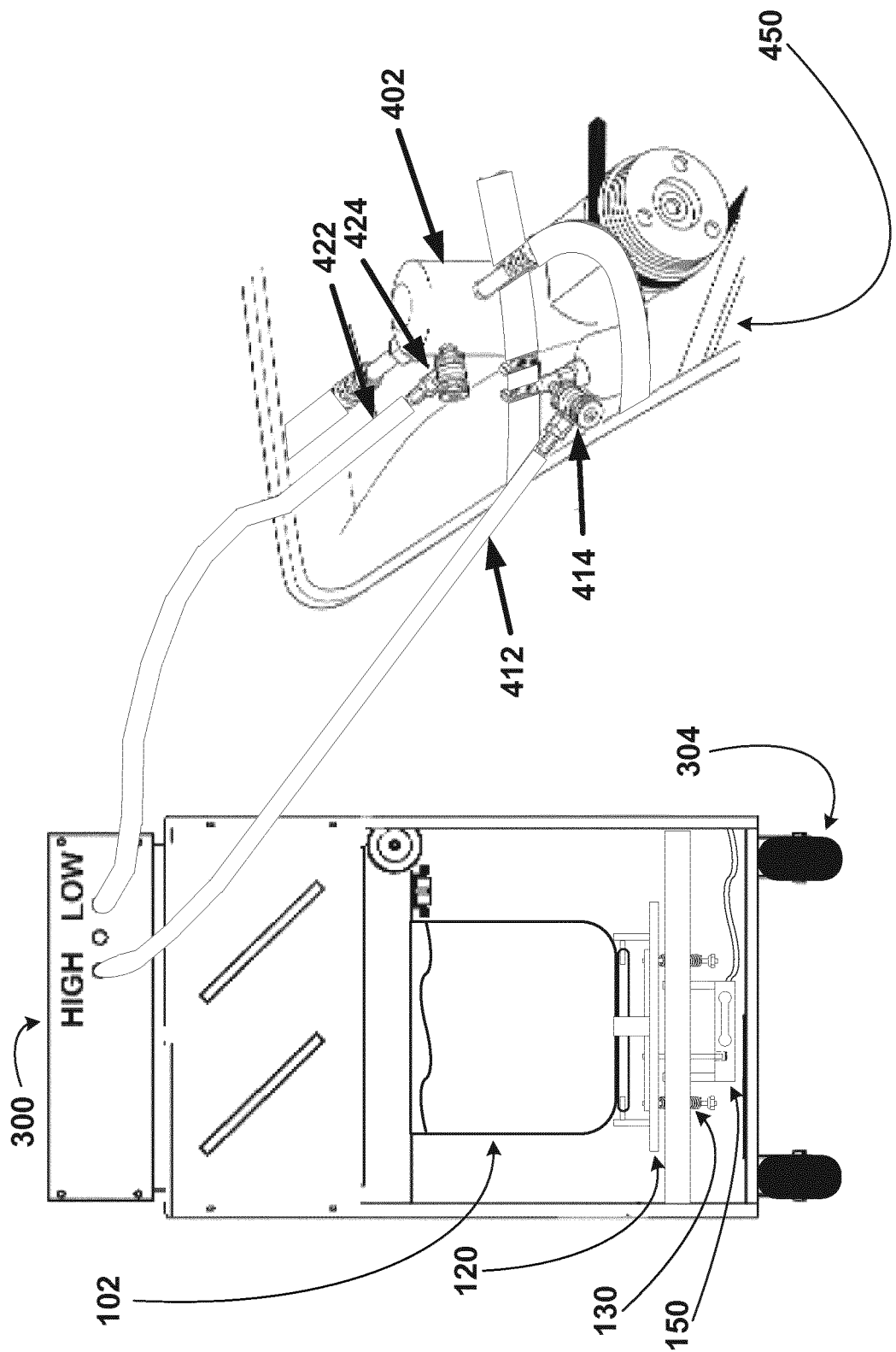
FIG. 4 is an illustration of a unit connected to a vehicle, according to example embodiments.

A vehicle as described herein, such as the vehicle 450 partially illustrated in FIG. 4, is a mobile machine that can be used to transport a person, people, and/or cargo. Any vehicle described herein can be driven and/or otherwise guided along a path (e.g., a paved road or otherwise) on land, in water, in the air, and/or outer space. Any vehicle described herein can be wheeled, tracked, railed, and/or skied. Any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine. As an example, a vehicle guided along a path can include a van (such as a dry or refrigerated van), a tank trailer, a platform trailer, or an automobile carrier. Any vehicle described herein can include and/or use any appropriate voltage and/or current source, such as a battery, an alternator, a fuel cell, and the like, providing any appropriate current and/or voltage, such as about 12 volts, about 42 volts, and the like. Any vehicle described herein can include and/or use any desired system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. Any vehicle described herein can include an electronic control unit (ECU), a data link connector (DLC), and a vehicle communication link that connects the DLC to the ECU.

The diagrams, flow charts, and data shown in the figures are provided merely as examples and are not intended to be limiting. Many of the elements illustrated in the figures and/or described herein are functional elements that can be implemented as discrete or distributed elements, individually or in conjunction with other element(s), and in any suitable combination and/or location. Those skilled in the art will appreciate that other arrangements and elements (e.g., machines, interfaces, functions, orders, and/or groupings of functions) can be used instead. Furthermore, the functions described as being performed by one or more elements can be carried out by a combination of hardware, firmware, and/or software (e.g., a processor that executes computer-readable program instructions).

II. Example Systems

FIG. 1 is an exploded-view illustration showing an apparatus 100. The apparatus 100 can be configured to weigh a storage tank 102 and contents thereof. In some embodiments, the storage tank 102 can be configured to store refrigerant. Further, the apparatus 100 can be a component of a refrigerant recovery unit, as further illustrated in FIGS. 3-5. In addition to the storage tank 102, the apparatus 100 can include a platform, which includes a second plate 110 and one or more legs 114, fasteners 112, a first plate 120, with fastener through-hole(s) 126 and leg through-hole(s) 124 defined therein and with tabs 122 protruding therefrom, one or more compression springs 130, one or more corresponding feet, which include a washer 116 and a nut 118, a spacer 140, with spacer through-hole(s) 142 defined therein, and a load cell 150, with engaging points 152 therein or thereon. One or more of the components illustrated in FIG. 1 can be machined using various processes, such as Computer Numeric Control (CNC).

The storage tank 102 can be configured to hold refrigerant, such as refrigerant used in air-conditioning systems in vehicles (e.g., industry standard refrigerants like dichlorodifluoromethane—R-12, chlorodifluoromethane—R-22, 1,1,1,2-tetrafluoroethane—R-134a, etc.), in some embodiments. The refrigerant stored within the storage tank 102 can be a liquid, a gas, or a combination of the two, in various embodiments. In one example embodiment, the storage tank 102 has a 30 lb. (13.6 kg) rated refrigerant capacity. The storage tank 102, when empty, can have a weight between 15-17 lb. (6.8-7.7 kg) In another example embodiment, the storage tank 102 has a 50 lb. (22.7 kg) rated refrigerant capacity and an empty weight between 28-32 lb. (12.7-14.5 kg) Various other storage tank 102 sizes and capacities are possible (e.g., 24 lb., 10.9 kg, rated refrigerant capacity storage tank 102).

The refrigerant within the storage tank 102 can be stored during a refrigerant recovery process, a refrigerant recycling process, or a refrigerant reintroduction process, in various embodiments. Further, the refrigerant recovery process, recycling process, or reintroduction process can include multiple phases or stages (e.g., one phase that withdraws refrigerant from a vehicle using a compressor and a second phase that withdraws refrigerant from a vehicle using a compressor aided by a vacuum pump).

In some embodiments, the storage tank 102 can also be detachable and/or interchangeable by a user of the apparatus 100. Further, the storage tank 102 can include a level indicator that displays to a user of the apparatus 100 how much of the storage tank 102 is filled with fluid (e.g., in case the load cell 150 is not functioning properly) and/or when the storage tank 102 needs to be replaced/changed. Further, the storage tank 102 can include a temperature probe. The temperature probe could have an analog or digital display that is legible by users of the apparatus 100, in some embodiments. Additionally or alternatively, the temperature probe could transmit temperature measurements to a control system within the apparatus 100. The temperature within the storage tank 102 can indicate whether refrigerant within the storage tank 102 is in a gaseous or a liquid state.

Further, the storage tank 102 can have nozzle and/or hose attachments configured to attach the storage tank 102 to other components. For example, the storage tank 102 can be attachable to a vehicle or to other components within a refrigerant recovery unit. In some embodiments, the storage tank 102 will have a manometer attached to measure pressure within the storage tank 102. In addition, the storage tank 102 can have a ring. The ring can form a base or a crown of the storage tank 102, in various embodiments. The ring further, in some embodiments, can have through-holes therein, allowing the storage tank 102 to be readily and removably attachable to the first plate 120, for example.

Figure 2A:
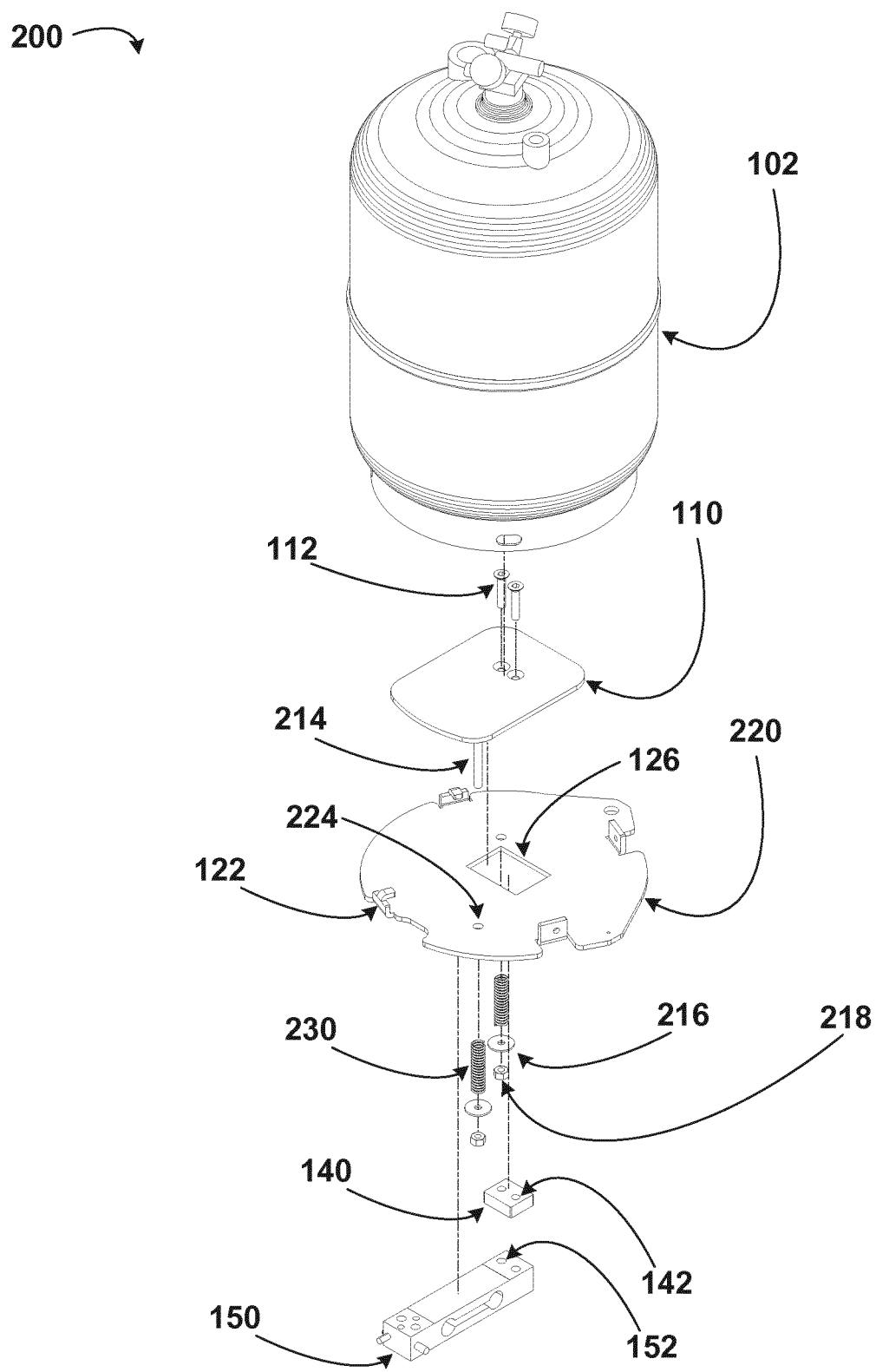
FIG. 2a is an exploded-view illustration of another apparatus, according to example embodiments.
Figure 2B:
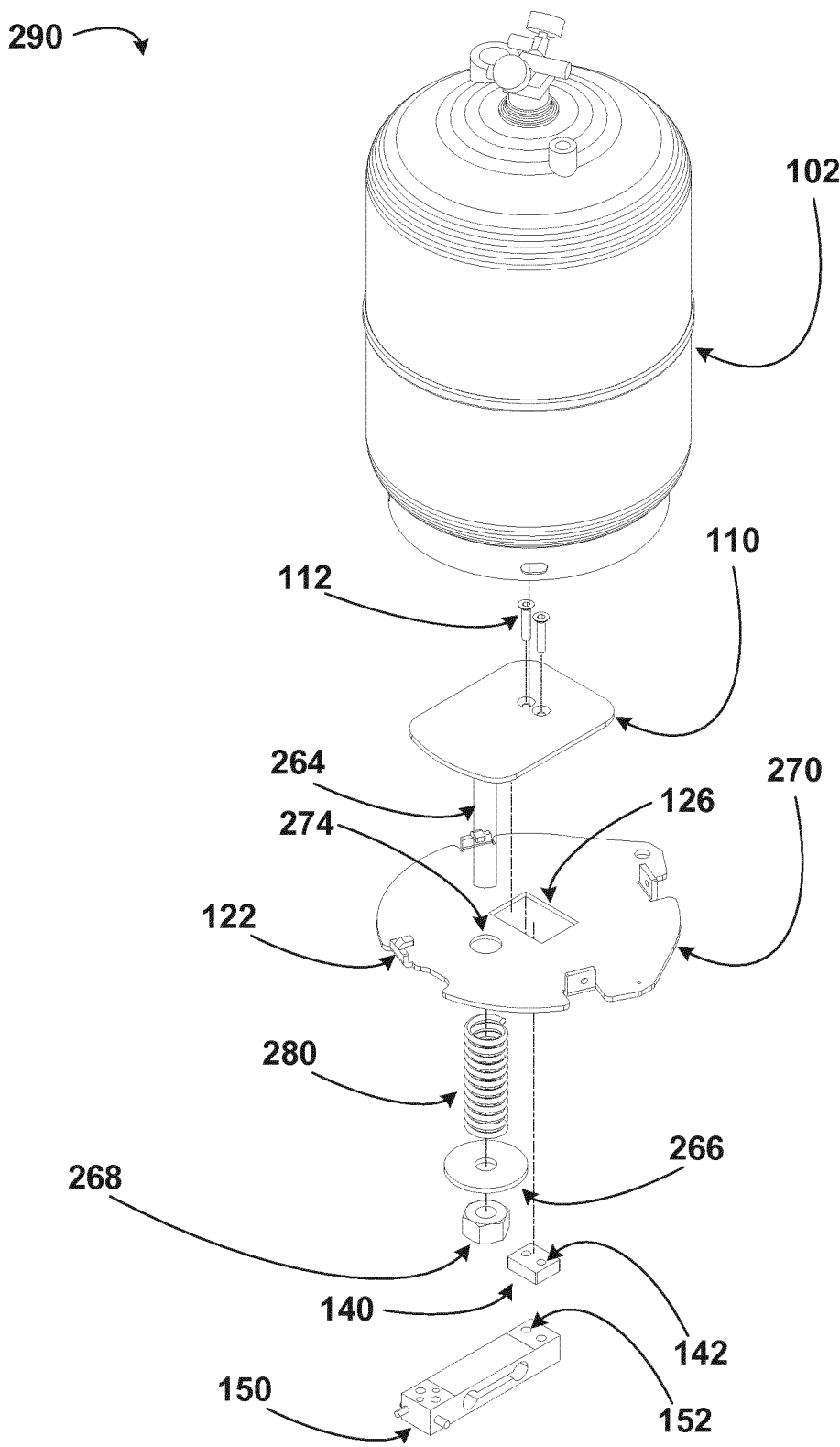
FIG. 2b is an exploded-view illustration of another apparatus, according to example embodiments.
Figure 2C:
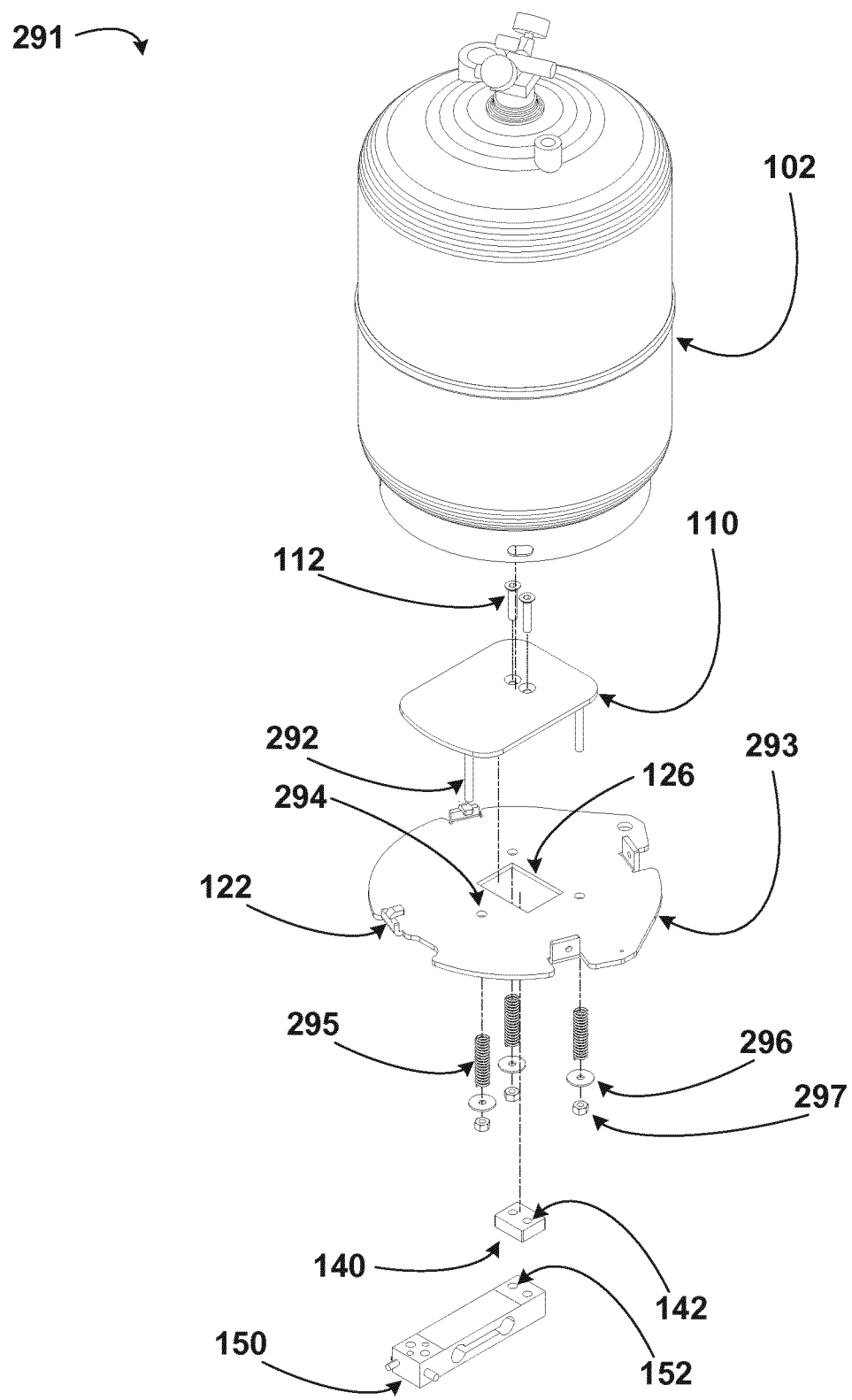
FIG. 2c is an exploded-view illustration of another apparatus, according to example embodiments.

The second plate 110 and the legs 114 jointly form the platform. The platform is configured to transfer force from the feet, and thus indirectly from the first plate 120, to the load cell 150. The legs 114 are pressed, welded, screwed, or adhered to the second plate 110, in various embodiments. Other methods of attaching the legs 114 to the second plate 110 are also possible. In alternate embodiments, as illustrated in FIGS. 2a, 2b, and 2c, the platform can include differing numbers of legs, such as one, two, or three rather than four, for example. Other numbers of legs 114 are also possible. Further, the arrangement of the legs 114 can vary among embodiments. For example, the legs 114 could be arranged in a line rather than occupy the four corners of the second plate 110, as illustrated in FIG. 1. Additionally in the embodiment illustrated in FIG. 1, the legs 114 are threaded, allowing the respective nuts 118 to be threaded onto the legs 114.

The second plate 110, as illustrated, is a substantially planar piece to which the legs 114 are attached. Also as illustrated in FIG. 1, the second plate 110 can be disposed within a region defined by a ring on the storage tank 102. Fasteners 112 that are intended to transfer force to the load cell 150 are also attached to or engaged with the second plate 110, in some embodiments. The second plate 110 can be fabricated of machined metal, such as steel, for example. In alternate embodiments, the second plate 110 could be replaced with a sheet, a block, a beam, or alternate structure(s) capable of transferring force from the legs 114 to the load cell 150. In further alternative embodiments, various subsets of the following could be machined from or molded out of a single, continuous piece of material: the legs 114, the second plate 110, the feet (e.g., if a metallic foot at the bottom of the legs 114 replaced the washer 116 and the nut 118), and the fasteners 112.

The fasteners 112 connect the second plate 110 to the load cell 150. The fasteners 112 can run through the fastener through-hole(s) 126 and/or the spacer through-hole(s) 142, as illustrated in FIG. 1. Further, the fasteners 112 can engage the load cell 150 at the defined engaging points 152. The engaging points 152 could be defined by slots, grooves, or pads in or on the load cell 150, for example. In alternate embodiments, there could be a greater or lesser number of fasteners 112 than illustrated in FIG. 1. For example, there could be one, three, or four fasteners in a given apparatus. The fasteners 112 could be screws embedded in the second plate 114 in countersunk portions of through-holes, in some embodiments. Instead, the fasteners 112 could be pins, poles, stakes, nails, and/or rods. Other fastener types are also possible. In still other embodiments, the feet could be directly attached to the load cell by means of fasteners. In such an embodiment, the second plate 110 would be bypassed and the force from the compression springs 130 would be applied to the feet and then to the load cell 150.

The first plate 120, as illustrated in FIG. 1, is a substantially planar piece. The first plate 120 is removably connected to the storage tank 102. As illustrated in FIG. 1, the first plate 120 can be connected to the storage tank 102 at tabs 122 on the first plate 120. Additionally or alternatively, the first plate 120 could be connected to the storage tank at one or more mounting brackets and/or one or more hooks. In alternate embodiments, the number of tabs 122 could be different (e.g., two tabs, three tabs, or five tabs). The first plate 120 can be removably attached to mounting points on the storage tank 102 (e.g., through-holes in a ring, as illustrated in FIG. 1) using various fasteners (e.g., nail, screw, bolt, etc.). Other means of removably attaching the first plate 120 to the storage tank 102 are also possible. The first plate 120 can be fabricated of machined metal, such as steel, for example. In alternate embodiments, the first plate 120 could be replaced by a sheet, a block, a beam, or other alternate structure(s).

The first plate 120, as illustrated in FIG. 1, additionally has holes defined therein. Such holes include the fastener through-hole 126 and leg through-holes 124. Depending on the number of legs 114 in a given embodiment of the apparatus 100, the number of leg through-holes 124 can vary among embodiments. Further, the position of the leg through-holes 124 can also vary depending on the number and position of the legs 114. Alternatively, multiple legs 114 could go through the same leg through-hole. This could permit the use of fewer leg through-holes than the number of legs 114 present in the apparatus 100.

In the embodiment of FIG. 1, both of the fasteners 112 are going through the same fastener through-hole 126. In alternate embodiments, each of the fasteners 112 could pass through separate fastener through-holes. Similarly to the leg through-holes 124, depending on the number of fasteners 112 in a given embodiment of the apparatus 100, the number of fastener through-holes 126 can vary among embodiments. Further, the position of the fastener through-hole 124 can also vary depending on the number and position of the fasteners 112.

In still other embodiments, one or more of the fasteners 112 and one or more of the legs 114 could go through a single through-hole. In an alternate example embodiment, one through-hole could be defined in the center of the first plate 120, and all the legs 114 and fasteners 112 could pass through the single, universal through-hole.

As shown in FIG. 1, the first plate 120 is supported by the compression springs 130. The compression springs 130 can be coil springs, as in the embodiment illustrated in FIG. 1. The compression springs 130 can be preloaded (e.g., based on the positioning of the washers 116 and nuts 118), such that a top-side of the first plate 120 engages the bottom-side of the second plate 130. In some embodiments, the first plate 120 can rest on top of the compression springs 130. In alternate embodiments, the compression springs 130 could be hooked or latched to the first plate 120. In still other embodiments, the compression springs 130 could be removably attached to a bottom-side of the first plate 120.

The compression springs 130 can act as oscillating and dampening mechanisms in the embodiment of FIG. 1. For example, the compression springs 130 can absorb energy imposed by the storage tank 102, and prevent that energy from being transmitted to the load cell 150, thereby protecting the load cell 150 from damage. Additionally or alternatively, the compression springs 130 can reduce an impulse, when compared to an alternative apparatus that does not include compression springs, transmitted from the storage tank 102 to the load cell 150 due to the weight of the storage tank 102 and any contents of the storage tank 102.

The compression springs 130 can have multiple attributes that define the functionality of the compression springs 130 within the apparatus 100. Such attributes can include a wire diameter, an outside diameter of the compression springs 130, a free length, an elastic constant (corresponding to a spring constant), a total number of coils, a maximum load, and a step size. The values of such attributes can vary among embodiments, with many values being possible. An example set of attributes includes compression springs 130 having a wire diameter between 1.5 and 2.0 mm (e.g., 1.8 mm), an outside diameter of the compression springs 130 between 11 and 12 mm (e.g., 11.7 mm), a free length between 35 and 40 mm (e.g., 37 mm), an elastic constant between 1.2 and 1.6 kg/mm (e.g., 1.4 kg/mm), which corresponds to a spring constant of between 11,760 and 15,680 N/m (e.g., 13,720 N/m), a total number of coils between 8 and 12 (e.g., 10 coils), a maximum load between 15 and 20 kg (e.g., 18 kg), and a step size between 4.0 and 4.5 mm (e.g., 4.2 mm). Other ranges are possible, for example, the spring constant could be between 13,500 and 14,000 N/m. In the embodiment illustrated in FIG. 1, the four compression springs 130 all have the same attributes as one another. However, in some embodiments, multiple different types of compression springs (e.g., compression springs having an array of attributes) can be used in the same apparatus 100.

In alternate embodiments, the compression springs 130 could be replaced or supplemented by other damping mechanisms (e.g., hydraulic dampers, magnetic dampers, viscoelastic materials, or piezoelectric dampers). In still other embodiments, the compression springs 130 could be replaced or supplemented by expansion springs. For example, if the load cell 150 were a spring scale and the storage tank 102 hung from the first plate 120, as opposed to resting on top of the first plate 120, the compression springs could be replaced by expansion springs.

The compression springs 130 are themselves supported by the feet of the legs 114 of the platform. The feet illustrated in FIG. 1 include the washers 116 and the nuts 118. The washers 116 can be slid over a portion of the respective legs 114. The nuts 118 can be threaded onto the bottom of the respective legs 114. Some embodiments can have multiple nuts 118 and or washers 116 constituting a single foot. For example, two nuts 118 could be used at the base of a foot to engage one another, thereby preventing vibrations and other movements from loosening the nuts 118 from the leg 114.

In alternate embodiments, there could be fewer or more feet than illustrated in FIG. 1 if the number of legs 114 varied in said alternate embodiments. In other embodiments, multiple feet could be combined. For example, one collective foot could be formed for all four of the legs 114 illustrated in FIG. 1 (e.g., a single plate could be attached to the base of all the legs 114 below the compression springs 130 to create a single, universal foot).

Additionally or alternatively, the washers 116 and nuts 118 could be replaced by other forms of feet. Metallic plates could replace the washers 116 and nuts 118, in some embodiments. The metallic plates could be adhered to, mounted to, removably attached to, pressed into, or welded to the legs, for example. In other embodiments, hooks at the base of the legs 114 could serve as feet, preventing the compression springs 130 from slipping off the legs 114.

The spacer 140 provides separation between the load cell 150 and the second plate 110, in some embodiments. As illustrated in FIG. 1, the spacer 140 can have spacer through-holes 142 through which the fasteners 112 pass. The spacer through-holes 142 can be made to align with the appropriate force application position(s) on the load cell 150 (e.g., engaging points 152). The spacer 140 can be made of steel coated with zinc, in some embodiments. Alternatively, the spacer 140 could be made of rubber or another cushioned material. In some embodiments, the spacer 140 could be reduced in size or removed completely. In other embodiments, the spacer 140 could be longer, thus enabling the load cell 150 to be further displaced from the load cell 150.

The load cell 150 is configured to measure force acting on the load cell 150. This force may be output as an electrical signal, in some embodiments. The electrical signal could be sent to a processing device or a control system (e.g., the control system illustrated in FIG. 6), for example. Alternatively or additionally, the force could be output to a display for viewing by a user of the apparatus 100. The force measured by the load cell 150 could correspond to the weight applied to the load cell by the other components of the apparatus 100. After accounting for the weight of all the other components of the apparatus 100 (e.g., by calibrating/zeroing the reading of the load cell 150 when there is no fluid in the storage tank 102), the force measured by the load cell 150 can correspond to the amount (weight) of refrigerant in the storage tank 102.

The load cell 150 can have force applied to it directly from the fasteners 112. This can occur at the engaging points 152, in the example embodiment of FIG. 1. The load cell 150 illustrated in FIG. 1 is fixed relative to the storage tank 102, the first plate 120, and the compression springs 130. The load cell 150 could be removably attached to and supported by a base, a shelf, or one or more sidewalls of a refrigerant recovery unit, for example. The load cell 150 could rest on such components, hang from such components, or be mounted to such components. For example, the load cell 150 could be bolted, screwed, nailed, adhered to, or welded to such components. Such components (e.g., a shelf between the load cell 150 and the first plate 120 to which the load cell 150 is mounted), could further act as mechanical stops, in some embodiments. For example, if the compression springs 130 were compressed to a certain point, a bottom-side of the first plate 120 could contact the shelf. The shelf could then prevent the first plate 120 from descending any further, thus preventing the compression springs 130 from further compression. Further, the spacer 140 could be adhered to the load cell 150 in some embodiments.

In various embodiments, the load cell 150 can of various different types. Some example load cells 150 include strain gauge load cells (e.g., shear beam load cells, double-ended shear beam load cells, or compression load cells), hydraulic load cells, and pneumatic load cells. The load cell 150 can be a transducer in multiple embodiments, whereby a voltage or a current output signal indicates a value of a corresponding force acting on the load cell 150.

FIG. 2a is an exploded-view illustration of another apparatus 200, according to example embodiments. The apparatus 200 illustrated in FIG. 2a is analogous to the apparatus 100 illustrated in FIG. 1. However, the apparatus 200 illustrated in FIG. 2a has two compression springs 230, as opposed to the four compression springs 130 in the embodiment of FIG. 1. The apparatus 200 therefore has two corresponding legs 214, and thus, two corresponding feet (each including a washer 216 and a nut 218). Also different from the embodiment of FIG. 1, the first plate 220 has two corresponding leg through-holes 224 rather than four, as illustrated in FIG. 1. As shown in FIG. 2a, the compression springs 230 are the same size as the compression springs 130 of FIG. 1 and the legs 214 are the same size as the legs 114 of FIG. 1. Many other alternate arrangements of compression springs, legs, leg through-holes, and feet are possible.

FIG. 2b is an exploded-view illustration of another apparatus 290, according to example embodiments. The apparatus 290 illustrated in FIG. 2b is analogous to the apparatus 100 illustrated in FIG. 1. However, the apparatus 290 illustrated in FIG. 2b has one compression spring 280, as opposed to the four compression springs 130 in the embodiment of FIG. 1. The apparatus 290 therefore has one corresponding leg 264, and thus, one corresponding foot (including a washer 266 and a nut 268). Also different from the embodiment of FIG. 1, the first plate 270 has one corresponding leg through-hole 274 rather than four, as illustrated in FIG. 1. As shown in FIG. 2b, the compression spring 280, the corresponding leg 264, the corresponding leg through-hole 274, and the corresponding foot (both the washer 266 and the nut 268) are larger than their counterparts in the embodiment of FIG. 1. The increase in size can aid in supplying sufficient force and/or dampening given that only one compression spring 280 is bearing the load of the storage tank 102 and the first plate 270. Other attributes, such as spring constant or maximum capacity could also be increased on the compression spring 280 in such an alternate embodiment as illustrated in FIG. 2b. Many other alternate arrangements of compression springs, legs, leg through-holes, and feet are possible.

FIG. 2c is an exploded-view illustration of another apparatus 291, according to example embodiments. The apparatus 291 illustrated in FIG. 2c is analogous to the apparatus 100 illustrated in FIG. 1. However, the apparatus 291 illustrated in FIG. 2c has three compression springs 295, as opposed to the four compression springs 130 in the embodiment of FIG. 1. The apparatus 291 therefore has three corresponding legs 292 (see FIG. 8), and thus, three corresponding feet (each including a washer 296 and a nut 297). Also different from the embodiment of FIG. 1, the first plate 293 has three corresponding leg through-holes 294 rather than four, as illustrated in FIG. 1. As shown in FIG. 2c, the compression springs 295 are the same size as the compression springs 130 of FIG. 1 and the legs 292 are the same size as the legs 114 of FIG. 1. Many other alternate arrangements of compression springs, legs, leg through-holes, and feet are possible.

Figure 8:
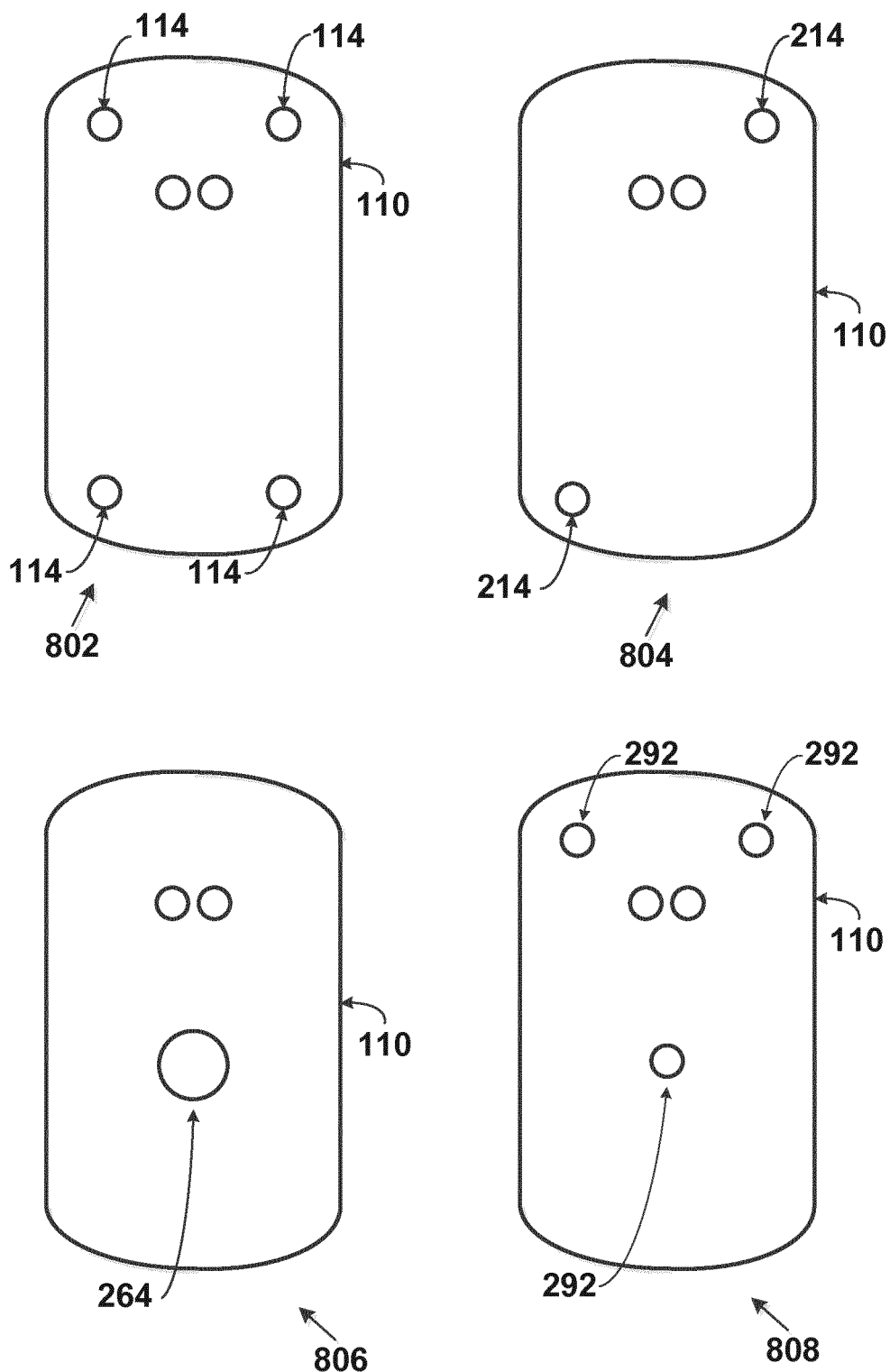
FIG. 8 shows multiple bottom-views of various second plates, according to example embodiments.

FIG. 8 shows bottom-views 802, 804, 806, and 808 of the second plate 110 shown in FIGS. 1, 2a, 2b, and 2c, respectively. FIG. 8 shows the legs 114, 214, 264, and 292 are cylindrical, but those legs could be formed in a different shape. The legs 114, 214, 264, and 292 include a top that abuts and/or goes into the second plate 110. The legs 114, 214, 264, and 292 include a bottom opposite the top. The top and/or bottom of each leg 114, 214, 264, and 292 can be threaded.

Figure 3:
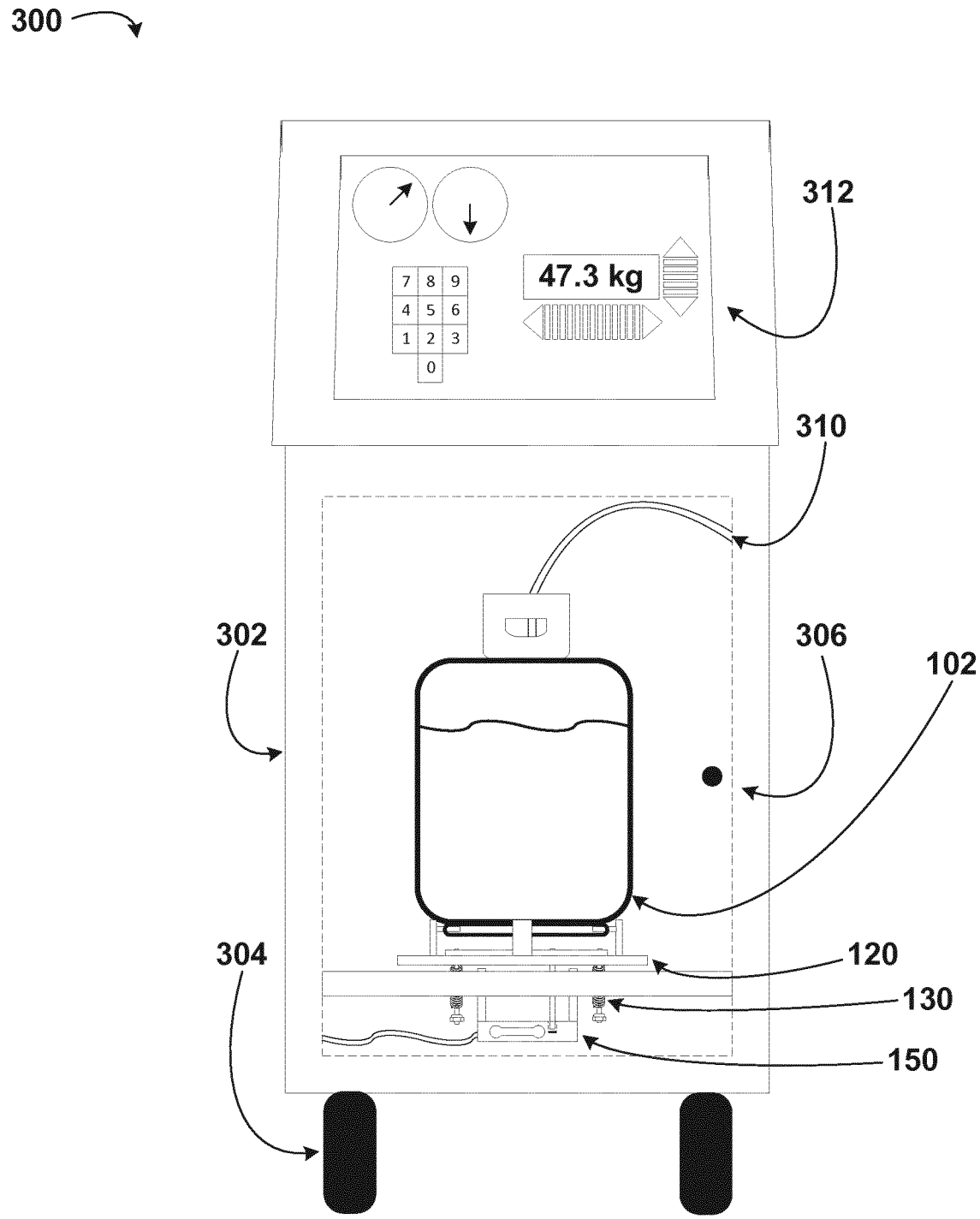
FIG. 3 is a front-view illustration of a unit, according to example embodiments.

FIG. 3 is a front-view illustration of a unit 300, according to example embodiments. The unit 300 is configured to recover, recycle, or reintroduce refrigerant from/to a vehicle refrigerant system. The unit 300 can additionally be configured to recover, recycle, or reintroduce other fluids from vehicle systems that utilize refrigerants (e.g., refrigerant oil from a vehicle refrigerant system). The unit 300 can include the apparatuses illustrated in FIG. 1, 2a, 2b, or 2c, for example. The unit 300 includes a chassis 302, two or more wheels 304, an access door 306, one or more plumbing components 310, a user interface 312, and the apparatus 100 illustrated in FIG. 1 (including the storage tank 102, the first plate 120, the compression springs 130, and the load cell 150). The unit 300 can be capable of meeting a Society of Automotive Engineers (SAE) certification standard set by the Environmental Protection Agency (EPA) of recovering 3 lb. (1.36 kg) of refrigerant in 30 minutes from a 2010 Chevrolet Suburban®.

The chassis 302 can house multiple components of the unit 300. For example, the chassis 302 can house the one or more plumbing components 310. Example plumbing components include valves, tubes, a vacuum pump, a condenser, hoses, nozzles, and/or a compressor. In addition, the chassis 302 houses the storage tank 102 and other components of the apparatus 100 illustrated in FIG. 1. The chassis 302 can further house electronic components, such as a control system (e.g., the control system of FIG. 6 and/or a processor that interacts with the user interface 312. The chassis 302 can also house a power supply, such as a battery or a converter that can be electrically connected to a standard outlet. The chassis 302 can have shelves to separate different components housed within the chassis 302 (e.g., a shelf to which the load cell 150 is attached, as illustrated in FIG. 3). Alternatively or additionally, the chassis 302 can have mounting brackets to which components of the unit 300 are mounted.

The two or more wheels 304 enable the unit 300 to be rolled from one location to another within a shop or a garage, for example. In some embodiments, the wheels can have two rotational degrees of freedom (e.g., casters). In the example embodiment of FIG. 3, the unit 300 comprises four wheels, two in the front and two in the back.

The access door 306 can be a hinged piece of metal or plastic. Alternatively, as shown in FIG. 3, the access door 306 can be made of a transparent material, such as poly (methyl methacrylate) (PMMA). The access door 306 can permit a user to inspect components of the unit 300 to troubleshoot the unit 300 if it is not in working order. Furthermore, the access door 306 can be closed to prevent interference with the components of the unit 300 or contamination of the fluids within the unit 300. The access door 306 can be lockable, in some embodiments.

The storage tank 102 is configured to store the refrigerant recovered from the vehicle during a recovery process, a recycling process, and/or a reintroduction process. The storage tank 102 can be pressurized, in some embodiments, to maintain the recovered refrigerant in a gaseous state, for example. In some embodiments, the storage tank 102 can be temperature/climate controlled within the unit 300.

The one or more plumbing components 310 serve as interconnects between components within the unit 300. The one or more plumbing components 310 can include hoses that connect the tank 102 to other components within the unit 300, as illustrated in FIG. 3.

The user interface 312 can facilitate the interaction of the unit 300 with a human or non-human user, such as to receive input from a user and to provide feedback to the user. The user interface 312 can allow, for example, a user to input data that corresponds to process settings or to receive feedback regarding process details. The user interface 312 can include input components such as a keypad, keyboard, touch-sensitive or presence-sensitive panel, joystick, microphone, still camera, and/or video camera. The user interface 312 can also include one or more output components such as a display screen (which, for example, can be combined with a presence-sensitive panel), a cathode ray tube (CRT), a liquid crystal display (LCD), an LED-based display, a display using digital light processing (DLP®) technology, a light bulb, and/or one or more other similar devices, now known or later developed. The user interface 312 can also be configured to generate audible output(s), via a speaker, speaker jack, audio output port, audio output device, earphones, and/or other similar devices, now known or later developed in the future. The outputs of the user interface 312 can be controlled by a control system (e.g., the control system illustrated in FIG. 6) within the unit 300 and the inputs from the user interface 312 can be transmitted to a control system within the unit 300, such as a processor executing instructions stored on a non-transitory computer-readable medium. The outputs of the user interface 312 can include pounds (kilograms) of refrigerant in the storage tank 102 or pounds (kilograms) of refrigerant currently in a vehicle being serviced, for example. Various other outputs of the user interface 312 are possible.

The apparatus could further include status lights that are be configured to indicate a determined current status of a recovery process, a recycling process, or a reintroduction process. The status lights could be light-emitting diodes (LEDs), fluorescent lights, or light bulbs, in various embodiments. The status lights could be controlled by a control system within the unit 300. In some embodiments, the status lights could be visible from 360 degrees around the unit 300 from the horizontal plane projected outward in all directions from each of the respective status lights. Additionally or alternatively, the status lights can be individually or collectively multiple colors. For example, one status light could be green and illuminated by the control system when the unit 300 status is "ready", another status light could be yellow and illuminated by the control system when the unit 300 status is "in progress", and a third status light could be red and illuminated by the control system when the unit 300 status is "user input required". The location of the illuminated status light could also indicate to a user the current status of the unit 300. In addition to "ready", "in progress", and "user input required", multiple other possible statuses can be indicated by additional colors, illumination patterns, and/or individual status lights. In alternate embodiments, there can be one status light that changes color based on the status of the unit 300 or changes a frequency at which it flashes based on the status of the unit 300.

The unit 300 could further include additional components, such as one or more vacuum pumps, one or more compressors, one or more condensers, one or more valves (e.g., three-way valves, electronic valves, and/or manual valves), lubricating oil and lubricating oil containers, pockets for storage, hoses, tubes, handles, etc. Such components can increase the user-friendliness of the unit 300 and/or the functionality of the unit 300.

FIG. 4 is an illustration of a unit 300 fluidly connected to a vehicle 450, according to example embodiments. The unit 300 is the same unit 300 as illustrated in FIG. 3 (shown in FIG. 4 from the back). As illustrated, FIG. 4 includes the two or more wheels 304 of the unit 300, as well as the apparatus 100 components of the unit 300. The unit 300 is connected to a vehicle refrigerant system 402 within the vehicle 450 using a high side hose 412 and a high side coupler 414 and a low side hose 422 and a low side coupler 424. The portion of the vehicle 450 illustrated in FIG. 4 can be located underneath the hood of the vehicle 450, for example, among other components of the vehicle 450.

The setup illustrated in FIG. 4 can be used to remove, recycle, and/or reintroduce refrigerant into the vehicle refrigerant system 402, in various embodiments. The refrigerant that is being removed, recycled, and/or reintroduced can be stored in the storage tank 102 during the process, for example, and the apparatus 100 of FIG. 1 can be used to determine the amount of refrigerant in the storage tank 102 at a given time. A control system (e.g., the control system illustrated in FIG. 6) could receive an electrical signal from the load cell 150 indicating the amount of refrigerant (e.g., measured in pounds or kilograms) within the storage tank 102. This could then be converted to the amount of refrigerant within the vehicle refrigerant system 402 by the control system. In some embodiments, a vehicle make, model, and/or model year can be programmed into the control system. Then, upon receiving an electrical signal from the load cell 150, the control system determines the weight of the apparatus 100 (not including the load cell 150)

plus the weight of the refrigerant in the storage tank 102. The control system could then subtract a known weight of the apparatus 100 to determine the weight of the refrigerant in the storage tank 102. This corresponding weight can then be recorded as an initial reading. As the refrigerant is removed from or added to the vehicle refrigerant system 402, more measurements can be taken. By subtracting a recent measurement from the initial reading, the amount of refrigerant added to or removed from the vehicle refrigerant system 402 can be determined by the control system. The control system can then compare the corresponding amount of refrigerant added to or removed from the vehicle refrigerant system 402 to a refrigerant capacity corresponding to the vehicle make, model, and/or model year programmed into the control system to determine a percentage of refrigerant capacity added to or removed from the vehicle refrigerant system 402.

The high side coupler 414 and the low side coupler 424 can be a high pressure fitting and a low pressure fitting of the unit 300, respectively. The low side coupler 424 and the high side coupler 414 can permit fluid communication between the unit 300 and the vehicle 450. The low side coupler 424 and the high side coupler 414 can be female connectors as illustrated in FIG. 4. As illustrated, the low side coupler 424 and the high side coupler 414 are female connectors threaded on the inside to allow for mating with respective male connectors on the vehicle refrigerant system 402 within the vehicle 450. Alternatively, the low side coupler 424 and the high side coupler 414 could be male connectors attached to corresponding female connectors on the vehicle refrigerant system 402.

In some embodiments, the low side coupler 424 and the high side coupler 414 can be interchangeable components of the unit 300, allowing connections to a wide array of vehicle makes and models, each with a potentially unique vehicle refrigerant systems 402 (e.g., air-conditioning unit). The high side coupler 414 can be connected to the unit 300 through the high side hose 412. The low side coupler 424 can be connected to the unit 300 through the low side hose 422. In some embodiments, the low side hose 422 and the high side hose 412 can be of similar hose styles (e.g., the same cross-sectional area and/or rated for the same maximum fluid pressure). In alternate embodiments, however, the low side hose 422 and the high side hose 412 could be of different hose styles (e.g., the high side hose could be rated for a higher maximum fluid pressure).

Figure 5:
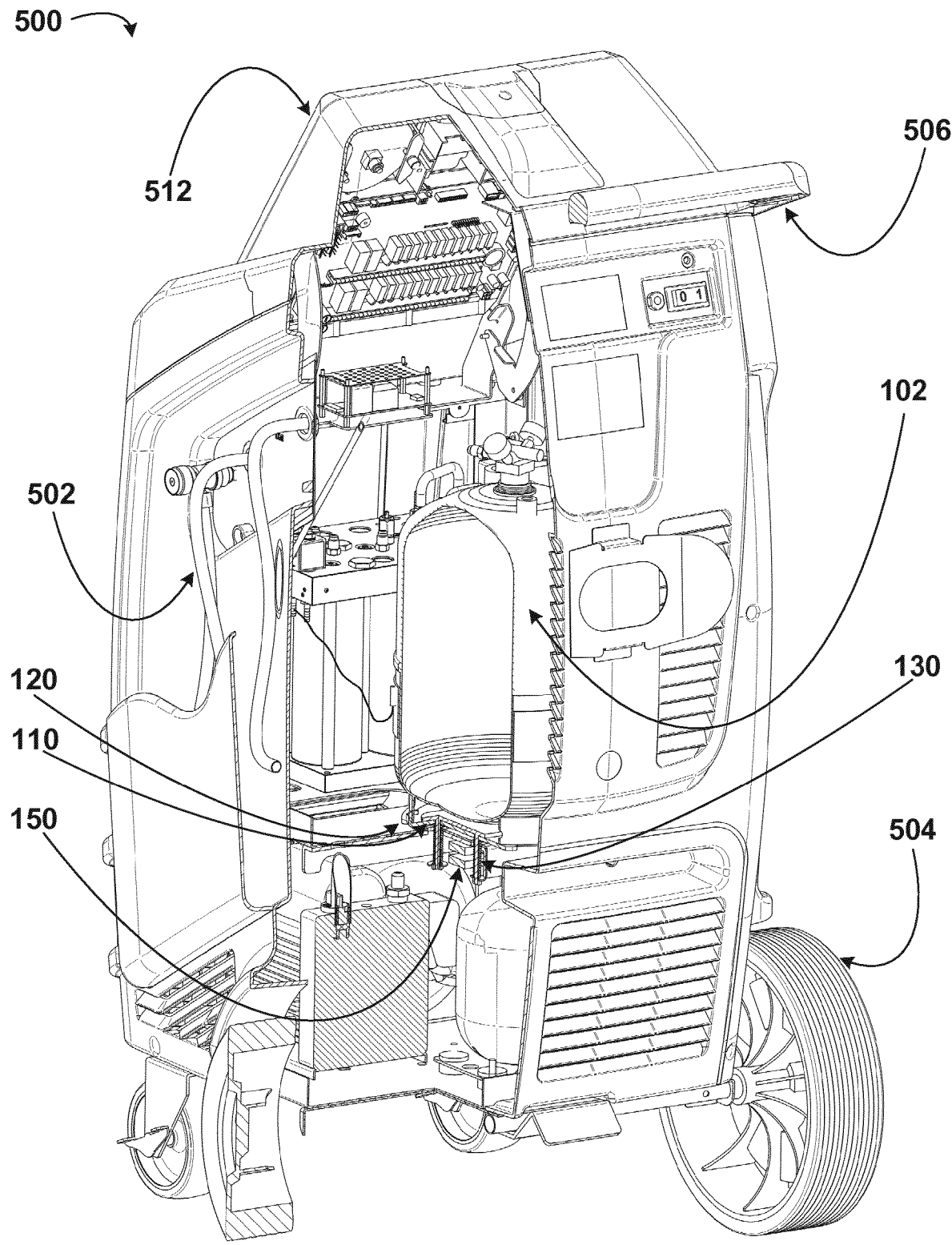
FIG. 5 is a cutaway view illustration of a unit, according to example embodiments.

FIG. 5 is a cutaway view of a unit 500, according to example embodiments. The unit 500 could be analogous to the unit 300 illustrated in FIGS. 3 and 4. Likewise, the unit 500 can be configured to perform a refrigerant recovery process, a refrigerant recycling process, and/or a refrigerant reintroduction process on a vehicle refrigerant system. The unit 500 illustrated in FIG. 5 includes a user interface 512, internal plumbing 502, four wheels 504, a handle 506, and components of the apparatus 100 illustrated in FIG. 1 (e.g., the storage tank 102, the second plate 110, the first plate 120, the compression springs 130, and the load cell 150). As illustrated in FIG. 5, the unit 500 can additionally have air outlet ports (e.g., for releasing heat from the unit 500), one or more batteries, one or more additionally tanks (e.g., to store oil used by a compressor and/or a vacuum pump), and a hook around which a hose (e.g., a hose that is part of the internal plumbing 502 or a low side hose and/or high side hose used to fluidly connect the unit 500 to a vehicle, such as in FIG. 4) can be wrapped. Various other components could also be included in the unit 500 allowing the unit 500 to perform various additionally functions by the unit 500.

Analogous to the user interface 312 illustrated in FIG. 3, the user interface 512 can facilitate the interaction of the unit 500 with a human or non-human user, such as to receive input from a user and to provide feedback to the user. The user interface 512 can allow, for example, a user to input data that corresponds to process settings or to receive feedback regarding process details. The user interface 512 can include input components such as a keypad, keyboard, touch-sensitive or presence-sensitive panel, joystick, microphone, still camera, and/or video camera. The user interface 512 can also include one or more output components such as a display screen (which, for example, can be combined with a presence-sensitive panel), a CRT, an LCD, an LED-based display, a display using DLP® technology, a light bulb, and/or one or more other similar devices, now known or later developed. The user interface 512 can also be configured to generate audible output(s), via a speaker, speaker jack, audio output port, audio output device, earphones, and/or other similar devices, now known or later developed in the future. The outputs of the user interface 512 can be controlled by a control system (e.g., the control system illustrated in FIG. 6) within the unit 500 and the inputs from the user interface 512 can be transmitted to a control system within the unit 500, such as a processor executing instructions stored on a non-transitory computer-readable medium. The outputs of the user interface 512 can include pounds (kilograms) of refrigerant in the storage tank 102 or pounds (kilograms) of refrigerant currently in a vehicle being serviced, for example. Various other outputs of the user interface 512 are possible.

The internal plumbing 502 can include valves, tubes, hoses, nozzles, compressors, vacuum pumps, and various other components used to transmit fluid around a fluid flow path. The fluid flow path can be a path through which vehicle refrigerant flows, for example. Further, the fluid flow path can be defined within the unit 500 or between the unit 500 and a vehicle refrigerant system, in various embodiments. Such internal plumbing 502 can be interchangeable. For example, if a higher flow capacity is desired within the fluid flow path, hoses within the internal plumbing 502 can be swapped for larger hoses having larger cross-sectional areas.

Analogous to the wheels 304 of the unit 300 in FIG. 3, the four wheels 504 illustrated in FIG. 5 enable the unit 500 to be rolled from one location to another within a shop or a garage, for example. In some embodiments, the wheels can have two rotational degrees of freedom (e.g., casters, such as those on the front of the unit 500, as illustrated). In the example embodiment of FIG. 5, the unit 500 comprises two wheels in the front and two wheels in the back. Various other numbers of wheels and wheel arrangements are possible (e.g., two wheels, three wheels arranged two in back and one in front, five wheels, or six wheels arranged three along a left side of the unit 500 and three along a right side of the unit 500). As illustrated, the two wheels in the back of the unit 500 are larger in diameter than the two in the front. In various embodiments, one or more of the wheels can have various sizes and shapes when compared with the other wheels.

The handle 506 can allow for engagement by a human or a non-human user to transport the unit 500. In this way, the unit 500 can be pushed or pulled from one location to another. In alternate embodiments, the unit 500 could have multiple handles, and/or the handle(s) could be positioned in different locations on the unit 500.

Figure 6:
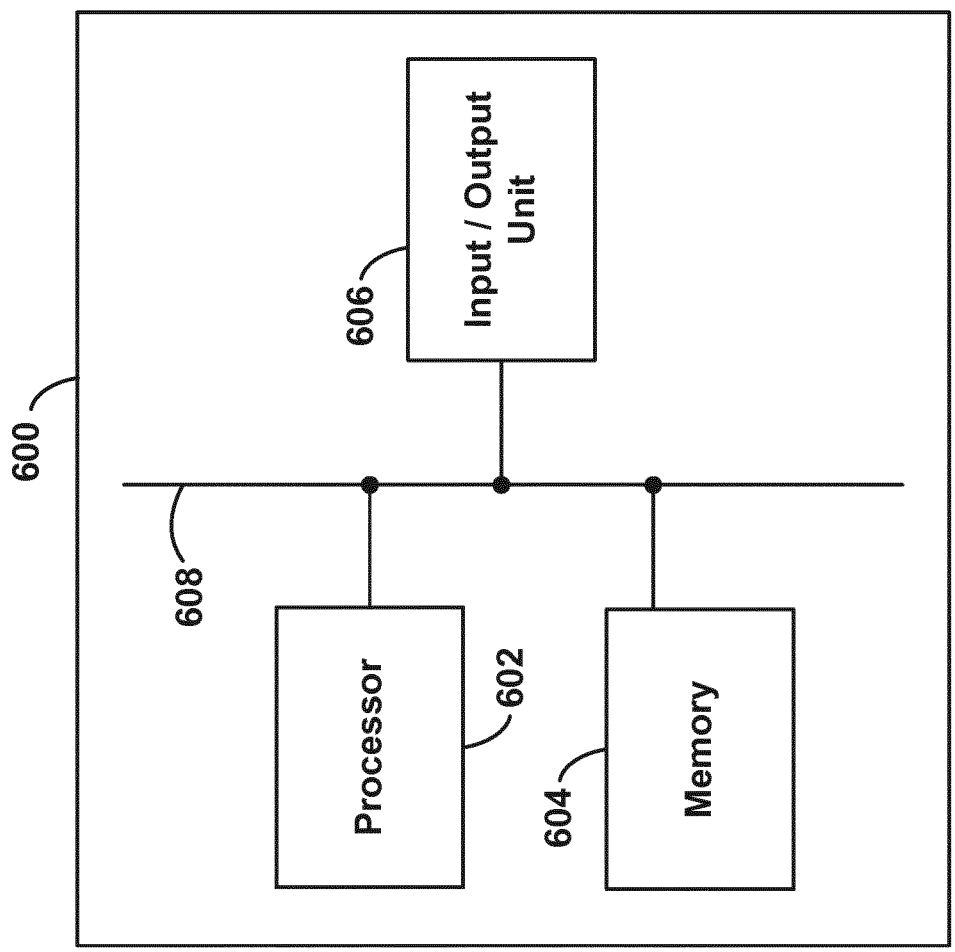
FIG. 6 is a block diagram illustration of a control system, according to example embodiments.

FIG. 6 is a block diagram of a control system 600, such as the control system described with respect to the apparatuses/units of FIGS. 1-5, for example. The control system 600 can be configured to control a unit (e.g., the unit 300) during a measurement process, refrigerant recovery process, recycling process, and/or reintroduction process, according to example embodiments. The control system 300 can include a processor 602, a memory 604, and one or more input/output units 606, all of which can be coupled by a system bus 608 or similar mechanism.

The processor 602 can include one or more central processing units (CPUs), such as one or more general purpose processors and/or one or more dedicated processors (e.g., application specific integrated circuits, ASICs).

The memory 604, in turn, can comprise volatile and/or non-volatile data storage and can be integrated in whole or in part with the processor 602. The memory 604 can store program instructions, executable by the processor 602, and data that are manipulated by these instructions to carry out the various methods, processes, or functions described herein. Alternatively, these methods, processes, or operations can be defined by hardware, firmware, and/or any combination of hardware, firmware, and software. Therefore, the memory 604 can include a tangible, non-transitory computer-readable medium, having stored thereon program instructions that, upon execution by one or more processors 602, cause the respective devices to carry out any of the methods, processes, or functions disclosed in this specification or the accompanying drawings.

In addition, the memory 604 can store information needed to complete a recovery process, a recycling process, and/or a reintroduction process. For example, the memory 604 can store values corresponding to maximum refrigerant capacities of the storage tank 102 and/or refrigerant capacities for various makes, models, and/or model years of vehicles.

The input/output unit 606 can include any elements included in a user interface. For instance, the input/output unit 606 can be a display for providing feedback to an end user of the apparatus 100. Additionally or alternatively, the input/output unit 606 can include a keypad for accepting user input. Thus, the input/output unit 606 can serve to configure and/or control the operation of the processor 602. The input/output unit 606 can include status indicators, such as LEDs for indicating information about the control system/unit 300, such as whether the unit 300 is powered on, the amount of space left in the storage tank 102, the lifetime run-time of the unit 300, etc. In some embodiments, the control system 600 will include multiple input/output units 606.

III. Example Operation

Figure 7:
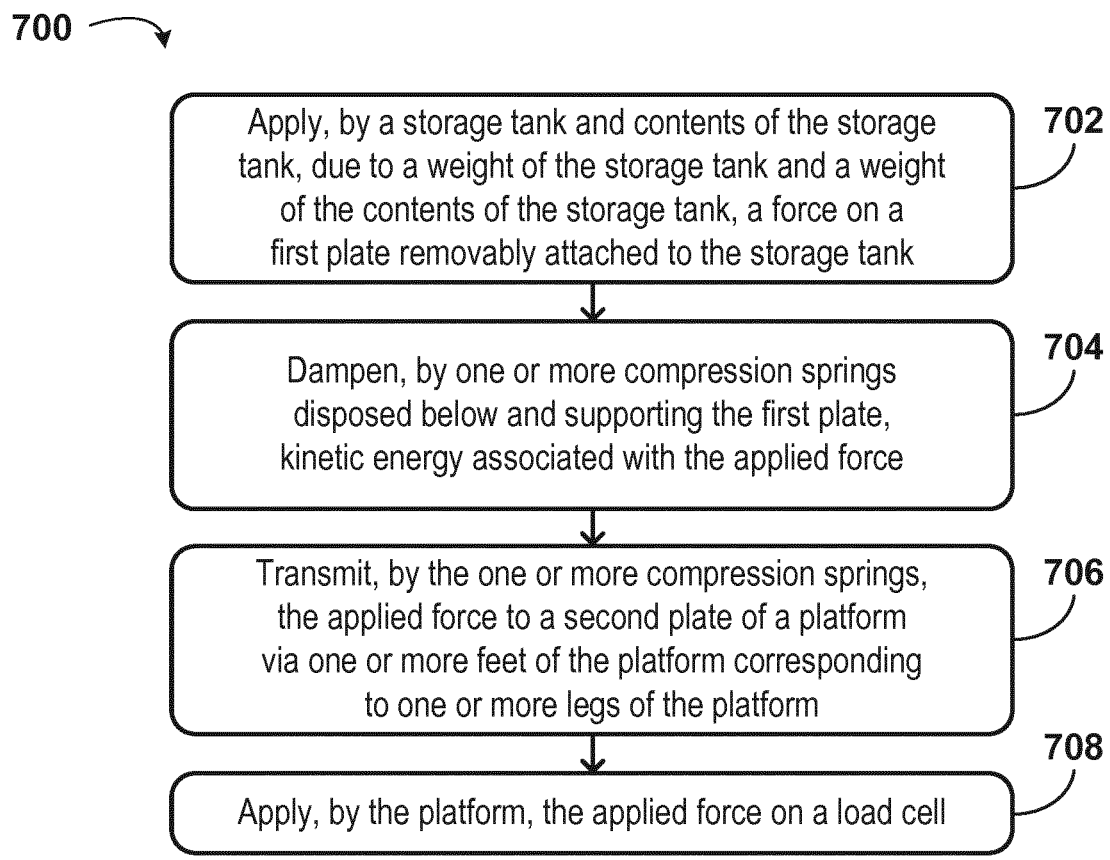
FIG. 7 is a flow chart illustration of a method, according to example embodiments.

FIG. 7 is a flow chart illustration of a method 700 of measuring a weight of a storage tank (e.g., the storage tank 102 illustrated in FIGS. 1-5) and any contents of the storage tank. The method includes the steps shown (702, 704, 706, 708). The following description of the method 700 includes references to elements shown in other figures described in this description, but the steps of the method 700 are not limited to being carried out only by the referenced elements. A variety of methods can be performed using all of the steps shown in the method 700 or any proper subset of the steps shown in the method 700. One or more of the steps shown in the method 700 can be carried out multiple times in performing a method in accordance with the example embodiments.

At step 702, the method 700 includes applying, by a storage tank (e.g., the storage tank 102 of the apparatus 100 illustrated in FIG. 1) and contents of the storage tank 102, due to a weight of the storage tank 102 and a weight of the contents of the storage tank 102, a force on a first plate (e.g., the first plate 120 of the apparatus 100 illustrated in FIG. 1) removably attached to the storage tank 102. The contents of the storage tank 102 could include refrigerant for use by vehicle refrigerant systems. The refrigerant could be previously removed from a vehicle refrigerant system or could be waiting to be injected into a vehicle refrigerant system, in various embodiments (e.g., the refrigerant could be in a process of being used in a refrigerant recovery process, a refrigerant recycling process, or a refrigerant reintroduction process).

At step 704, the method 700 includes dampening, by one or more compression springs (e.g., the compression springs 130 of the apparatus 100 illustrated in FIG. 1) disposed below and supporting the first plate 120, kinetic energy associated with the applied force.

At step 706, the method 700 includes transmitting, by the one or more compression springs 130, the applied force to a second plate (e.g., the second plate 110 of the apparatus 100 illustrated in FIG. 1) of a platform via one or more feet (e.g., the washers 116 and nuts 118 of the apparatus 100 illustrated in FIG. 1) of the platform corresponding to one or more legs (e.g., the legs 114 of the apparatus 100 illustrated in FIG. 1) of the platform. Each leg 114 of the platform can correspond to one of the one or more compression springs 130. Each leg can extend from the second plate 110 through a through-hole (e.g., the leg through-holes 124 within the first plate 120 of the apparatus 100 illustrated in FIG. 1) in the first plate 120 and through a center of the corresponding compression spring 130 to the one or more feet. The one or more feet can support the corresponding compression spring 130.

At step 708, the method 700 includes applying, by the platform, the applied force on a load cell (e.g., the load cell 150 of the apparatus 100 illustrated in FIG. 1).

In some embodiments of method 700, there can be additional steps after step 708. For example, the method 700 could include outputting the force applied to the load cell 150 by the load cell 150 via an electrical signal. The corresponding electrical signal could correspond to a weight of refrigerant within the storage tank 102. In such an embodiment, the method could further include displaying the measured weight of refrigerant on a display of the load cell 150 or of the unit 300. Additionally or alternatively, in such an embodiment, the load cell 150 could transmit an analog or digital signal to a processor (e.g., the processor 602 within the control system 600 illustrated in FIG. 6). In other embodiments, outputting the force applied to the load cell 150 could include generating a voltage differential across two leads of the load cell 150, wherein the voltage differential indicates the measured weight of refrigerant.

IV. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is an apparatus, comprising: a load cell; a storage tank; a first plate removably attached to the storage tank; one or more compression springs disposed below and supporting the first plate; and a platform comprising: a second plate, wherein the second plate is disposed between the first plate and the storage tank, and wherein the second plate engages the load cell; and one or more legs, wherein each leg corresponds to one of the one or more compressions springs, wherein each leg extends from the second plate through a through-hole in the first plate and through a center of the corresponding compression spring to a corresponding foot that supports the corresponding compression spring, and wherein the storage tank and the first plate are movable relative to the load cell and the platform.

EEE 2 is the apparatus of EEE 1, wherein the storage tank is configured to store refrigerant.

EEE 3 is the apparatus of EEE 1 or 2, wherein the load cell is configured to output an electrical signal to a computing device, and wherein the electrical signal indicates a value of force based upon a weight of any contents of the storage tank acting on the load cell.

EEE 4 is the apparatus of EEE 3, wherein the contents of the storage tank is refrigerant, and wherein the computing device comprises a processor configured to execute instructions stored on a non-transitory, computer-readable medium to determine a percentage of maximum refrigerant within a vehicle based on the electrical signal, calibration information, and vehicle data.

EEE 5 is the apparatus of any one of EEE 1 to 4, further comprising: one or more fasteners configured to removably attach the second plate to the load cell; and a spacer, wherein the spacer extends between the load cell and the second plate, wherein the first plate comprises at least one through-hole for passing through the first plate at least a portion of the one or more fasteners configured to removably attach the second plate to the load cell.

EEE 6 is the apparatus of any one of EEE 1 to 5, wherein the one or more compression springs comprise one or more coil springs.

EEE 7 is the apparatus of any one of EEE 1 to 6, wherein the one or more compression springs have corresponding spring constants in a range of 13,500-14,000 N/m.

EEE 8 is the apparatus of any one of EEE 1 to 7, wherein the load cell is removably attached to a base, a shelf, or one or more sidewalls of a refrigerant recovery apparatus.

EEE 9 is the apparatus of any one of EEE 1 to 8, further comprising a mechanical stop, wherein the mechanical stop defines a maximum amount of compression that can be undergone by the one or more compression springs after which the one or more compression springs are prevented from further compressing by the mechanical stop.

EEE 10 is the apparatus of any one of EEE 1 to 9, wherein the first plate comprises one or more tabs, one or more mounting brackets, and/or one or more hooks to which the storage tank is fastened.

EEE 11 is the apparatus of any one of EEE 1 to 10, wherein the load cell comprises a strain gauge load cell.

EEE 12 is the apparatus of any one of EEE 1 to 11, further comprising: one or more fasteners for removably attaching the first plate to the storage tank, wherein the storage tank comprises a ring, wherein the ring comprises one or more through-holes for passing into the first plate or a bracket attached to the first plate at least a portion of a corresponding fastener of the one or more fasteners for removably attaching the first plate to the storage tank, and wherein the second plate is disposed within a region defined by the ring.

EEE 13 is the apparatus of any one of EEE 1 to 12, wherein at least one portion of each leg of the one or more legs is threaded.

EEE 14 is the apparatus of any one of EEE 1 to 13, wherein each leg of the one or more legs is pressed into the second plate.

EEE 15 is the apparatus of any one of EEE 1 to 14, wherein the one or more compression springs are preloaded such that a top-side of the first plate engages a bottom-side of the second plate.

EEE 16 is the apparatus of any one of EEE 1 to 15, wherein the one or more compression springs comprise three compression springs, wherein the one or more legs comprise three legs, wherein the platform comprises three corresponding feet, and wherein the three corresponding feet each comprise at least one washer and at least one nut.

EEE 17 is the apparatus of any one of EEE 1 to 15, wherein the one or more compression springs comprise four compression springs, wherein the one or more legs comprise four legs, wherein the platform comprises four corresponding feet, and wherein the four corresponding feet each comprise at least one washer and at least one nut.

EEE 18 is the apparatus of any one of EEE 1 to 15, wherein the one or more compression springs comprise five compression springs, wherein the one or more legs comprise five legs, wherein the platform comprises five corresponding feet, and wherein the five corresponding feet each comprise at least one washer and at least one nut.

EEE 19 is a method, comprising: applying, by a storage tank and contents of the storage tank, due to a weight of the storage tank and a weight of the contents of the storage tank, a force on a first plate removably attached to the storage tank; dampening, by one or more compression springs disposed below and supporting the first plate, kinetic energy associated with the applied force; transmitting, by the one or more compression springs, the applied force to a second plate of a platform via one or more feet of the platform corresponding to one or more legs of the platform, wherein each leg of the platform corresponds to one of the one or more compression springs, wherein each leg extends from the second plate through a through-hole in the first plate and through a center of the corresponding compression spring to the one or more feet, and wherein the one or more feet support the corresponding compression spring; and applying, by the platform, the applied force on a load cell.

EEE 20 is the method of EEE 19, wherein the storage tank is configured to store refrigerant.

EEE 21 is the method of EEE 19 or 20, wherein the load cell is configured to output an electrical signal to a computing device, and wherein the electrical signal indicates a value of force based upon a weight of any contents of the storage tank acting on the load cell.

EEE 22 is the method of EEE 21, wherein the contents of the storage tank is refrigerant, and wherein the computing device comprises a processor configured to execute instructions stored on a non-transitory, computer-readable medium to determine a percentage of maximum refrigerant within a vehicle based on the electrical signal, calibration information, and vehicle data.

EEE 23 is the method of any one of EEE 19 to 22, wherein one or more fasteners removably attach the second plate to the load cell, wherein a spacer extends between the load cell and the second plate, and wherein the first plate comprises at least one through-hole for passing through the first plate at least a portion of the one or more fasteners that removably attach the second plate to the load cell.

EEE 24 is the method of any one of EEE 19 to 23, wherein the one or more compression springs comprise one or more coil springs.

EEE 25 is the method of any one of EEE 1 to 24, wherein the one or more compression springs have corresponding spring constants in a range of 13,500-14,000 N/m.

EEE 26 is the method of any one of EEE 1 to 25, wherein the load cell is removably attached to a base, a shelf, or one or more sidewalls of a refrigerant recovery apparatus.

EEE 27 is the method of any one of EEE 19 to 26, wherein a mechanical stop defines a maximum amount of compression that can be undergone by the one or more compression springs after which the one or more compression springs are prevented from further compressing by the mechanical stop.

EEE 28 is the method of any one of EEE 19 to 27, wherein the first plate comprises one or more tabs, one or more mounting brackets, and/or one or more hooks to which the storage tank is fastened.

EEE 29 is the method of any one of EEE 19 to 28, wherein the load cell comprises a strain gauge load cell.

EEE 30 is the method of any one of EEE 19 to 29, wherein one or more fasteners removably attach the first plate to the storage tank, wherein the storage tank comprises a ring, wherein the ring comprises one or more through-holes for passing into the first plate or a bracket attached to the first plate at least a portion of a corresponding fastener of the one or more fasteners that removably attach the first plate to the storage tank, and wherein the second plate is disposed within a region defined by the ring.

EEE 31 is the method of any one of EEE 19 to 30, wherein at least one portion of each leg of the one or more legs is threaded.

EEE 32 is the method of any one of EEE 19 to 31, wherein each leg of the one or more legs is pressed into the second plate.

EEE 33 is the method of any one of EEE 19 to 32, wherein the one or more compression springs are preloaded such that a top-side of the first plate engages a bottom-side of the second plate.

EEE 34 is the method of any one of EEE 19 to 33, wherein the one or more compression springs comprise three compression springs, wherein the one or more legs comprise three legs, wherein the platform comprises three corresponding feet, and wherein the three corresponding feet each comprise at least one washer and at least one nut.

EEE 35 is the method of any one of EEE 19 to 33, wherein the one or more compression springs comprise four compression springs, wherein the one or more legs comprise four legs, wherein the platform comprises four corresponding feet, and wherein the four corresponding feet each comprise at least one washer and at least one nut.

EEE 36 is the method of any one of EEE 19 to 33, wherein the one or more compression springs comprise five compression springs, wherein the one or more legs comprise five legs, wherein the platform comprises five corresponding feet, and wherein the five corresponding feet each comprise at least one washer and at least one nut.

What is claimed is:

1. An apparatus, comprising:
a load cell;
a storage tank;
a first plate removably attached to the storage tank;
one or more compression springs disposed below and supporting the first plate; and
a platform comprising:
a second plate, wherein the second plate is disposed between the first plate and the storage tank, and wherein the second plate includes one or more downwardly extending projections that engage and exert a force onto the load cell; and
one or more legs, wherein each leg corresponds to one of the one or more compressions springs, wherein each leg extends from the second plate through a through-hole in the first plate and through a center of the corresponding compression spring to a corresponding foot that supports the corresponding compression spring and each corresponding compression spring is supported by a foot positioned on the corresponding leg of the platform;
wherein each leg of the one or more legs and corresponding foot are attached to the second plate; and
wherein the storage tank and the first plate are movable relative to the load cell and the platform.

2. The apparatus of claim 1, wherein the storage tank and the first plate are movable relative to the load cell and the platform a distance equal to a distance the compression springs are compressed.

3. The apparatus of claim 1, wherein the load cell is configured to output an electrical signal to a computing device, and
wherein the electrical signal indicates a value of force based upon a weight of any contents of the storage tank acting on the load cell.

4. The apparatus of claim 3,
wherein the contents of the storage tank is refrigerant, and
wherein the computing device comprises a processor configured to execute instructions stored on a non-transitory, computer-readable medium to determine a percentage of maximum refrigerant within a vehicle based on the electrical signal, calibration information, and vehicle data.

5. The apparatus of claim 1, further comprising:
one or more fasteners configured to removably attach the second plate to the load cell; and
a spacer, wherein the spacer extends between the load cell and the second plate,
wherein the first plate comprises at least one through-hole for passing through the first plate at least a portion of the one or more fasteners configured to removably attach the second plate to the load cell.

6. The apparatus of claim 1, wherein the one or more compression springs comprise one or more coil springs.

7. The apparatus of claim 1, wherein the one or more compression springs have corresponding spring constants in a range of 13,500-14,000 N/m.

8. The apparatus of claim 1, wherein the load cell is removably attached to a base, a shelf, or one or more sidewalls of a refrigerant recovery apparatus.

9. The apparatus of claim 1, further comprising a mechanical stop, wherein the mechanical stop defines a maximum amount of compression that can be undergone by the one or more compression springs after which the one or more compression springs are prevented from further compressing by the mechanical stop.

10. The apparatus of claim 1,
wherein the one or more compression springs comprise four compression springs,
wherein the one or more legs comprise four legs,
wherein the platform comprises four corresponding feet, and
wherein the four corresponding feet each comprise at least one washer and at least one nut.

11. The apparatus of claim 1, wherein the first plate comprises one or more tabs, one or more mounting brackets, and/or one or more hooks to which the storage tank is fastened.

12. The apparatus of claim 1, wherein the load cell comprises a strain gauge load cell.

13. The apparatus of claim 1, further comprising:
one or more fasteners for removably attaching the first plate to the storage tank,
wherein the storage tank comprises a ring,
wherein the ring comprises one or more through-holes for passing into the first plate or a bracket attached to the first plate at least a portion of a corresponding fastener of the one or more fasteners for removably attaching the first plate to the storage tank, and
wherein the second plate is disposed within a region defined by the ring.

14. The apparatus of claim 1, wherein at least one portion of each leg of the one or more legs is threaded.

15. The apparatus of claim 1, wherein each leg of the one or more legs is pressed into the second plate.

16. The apparatus of claim 1, wherein the one or more compression springs are preloaded such that a top-side of the first plate engages a bottom-side of the second plate.

17. A method, comprising:
providing an apparatus including, a load cell, a storage tank, a first plate removably attached to the storage tank, one or more compression springs disposed below and supporting the first plate, and a platform comprising a second plate, wherein the second plate is disposed between the first plate and the storage tank, and wherein the second plate includes one or more downwardly extending projections that engage and exert a force onto the load cell, and one or more legs, wherein each leg corresponds to one of the one or more compressions springs, wherein each leg extends from the second plate through a through-hole in the first plate and through a center of the corresponding compression spring to a corresponding foot that supports the corresponding compression spring and each corresponding compression spring is supported by a foot positioned on the corresponding leg of the platform; wherein each leg of the one or more legs and corresponding foot are attached to the second plate, and wherein the storage tank and the first plate are movable relative to the load cell and the platform;
applying, by a storage tank and contents of the storage tank, due to a weight of the storage tank and a weight of the contents of the storage tank, a force on the first plate removably attached to the storage tank;
dampening, by the one or more compression springs kinetic energy associated with the force;
transmitting, by the one or more compression springs, the force to the second plate of the platform via one or more feet of the platform corresponding to one or more legs of the platform, wherein each leg extends from the second plate through a through-hole in the first plate and through a center of the corresponding compression spring to the one or more feet, and wherein the one or more feet support the corresponding compression spring; and
applying, the force through the one or more downwardly extending projections on the second plate on the load cell.

\* \* \* \* \*